US012024086B2

(12) United States Patent
Alexanian et al.

(10) Patent No.: US 12,024,086 B2
(45) Date of Patent: Jul. 2, 2024

(54) ELECTROMECHANICAL CONTROL SYSTEM FOR VEHICLE HOUSING AND DOOR SYSTEMS

(71) Applicant: ILLINOIS TOOL WORKS INC., Glenview, IL (US)

(72) Inventors: Shant B. Alexanian, Bolingbrook, IL (US); Christopher Thomas Schaafsma, Wheaton, IL (US); Saman Bagheri Farahani, Northbrook, IL (US); Mark O. Lepper, Oak Park, IL (US); David B. Pivonka, Winfield, IL (US)

(73) Assignee: Illinois Tool Works Inc., Glenview, IL (US)

( * ) Notice: Subject to any disclaimer, the term of this patent is extended or adjusted under 35 U.S.C. 154(b) by 201 days.

(21) Appl. No.: 17/610,809

(22) PCT Filed: May 22, 2020

(86) PCT No.: PCT/US2020/034315
§ 371 (c)(1),
(2) Date: Nov. 12, 2021

(87) PCT Pub. No.: WO2020/237183
PCT Pub. Date: Nov. 26, 2020

(65) Prior Publication Data
US 2022/0212595 A1    Jul. 7, 2022

Related U.S. Application Data

(60) Provisional application No. 62/880,901, filed on Jul. 31, 2019, provisional application No. 62/851,943, filed on May 23, 2019.

(51) Int. Cl.
*B60Q 1/26*      (2006.01)
*B60K 15/03*    (2006.01)
(Continued)

(52) U.S. Cl.
CPC ............ *B60Q 1/2661* (2013.01); *B60K 15/05* (2013.01); *B60Q 1/2603* (2013.01); *B60Q 1/50* (2013.01);
(Continued)

(58) Field of Classification Search
None
See application file for complete search history.

(56) References Cited

U.S. PATENT DOCUMENTS

2011/0043355 A1   2/2011  Chandler et al.
2012/0133282 A1*  5/2012  Rubio ................... B60Q 1/543
                                                                315/77
(Continued)

FOREIGN PATENT DOCUMENTS

CN     106882037 A    6/2017
CN     208656027 U    3/2019
(Continued)

OTHER PUBLICATIONS

International Search Report and Written Opinion for PCT/US2020/034315, dated Nov. 5, 2020 (18 pages).
(Continued)

*Primary Examiner* — Ashok Patel
(74) *Attorney, Agent, or Firm* — Quarles & Brady LLP (57) ABSTRACT

A control system is provided for a refuel or recharge door of a vehicle, which includes a vehicle controller. The system has a housing with a port, a door removably attached to the housing, a system controller, and at least one module. The system controller is communicably connected to a vehicle controller of the vehicle. Further, the system controller is configured to control the at least one module.

12 Claims, 7 Drawing Sheets

(51) Int. Cl.
    *B60K 15/05*     (2006.01)
    *B60Q 1/50*     (2006.01)

(52) U.S. Cl.
    CPC .............. *B60K 2015/03427* (2013.01); *B60K 2015/0561* (2013.01)

(56) References Cited

U.S. PATENT DOCUMENTS

| | | |
|---|---|---|
| 2013/0076059 A1 | 3/2013 | Zalan et al. |
| 2013/0134937 A1 | 5/2013 | Umeda et al. |
| 2015/0183316 A1 | 7/2015 | Wakamatsu et al. |
| 2017/0361761 A1 | 12/2017 | Salter et al. |
| 2019/0128043 A1 | 5/2019 | Ren et al. |

FOREIGN PATENT DOCUMENTS

| | | |
|---|---|---|
| DE | 10 2011 114075 A1 | 6/2012 |
| EP | 1785307 A1 | 5/2007 |
| JP | 2012034543 A | 2/2012 |
| JP | 2014060886 A | 4/2014 |
| JP | 2017171105 A | 9/2017 |
| WO | 2014/001471 A2 | 1/2014 |

OTHER PUBLICATIONS

First Office Action for CN 202080034313.2, mailed Oct. 10, 2023, 15 pages.

\* cited by examiner

ELECTROMECHANICAL CONTROL SYSTEM FOR VEHICLE HOUSING AND DOOR SYSTEMS

CROSS REFERENCE TO RELATED APPLICATIONS

This application represents the United States National Stage of International Application No. PCT/US2020/034315, filed May 22, 2020, which relates to and claims priority to U.S. Provisional Application No. 62/851,943 filed on May 23, 2019, and U.S. Provisional Application No. 62/880,901 filed on Jul. 31, 2019, each of which is hereby incorporated by reference in its entirety.

FIELD OF THE DISCLOSURE

Embodiments of the present disclosure generally relate to electromechanical control systems, and more particularly, to systems having a controller for automotive fuel/recharge doors and housings.

BACKGROUND

Gas powered vehicles generally include a fuel door that is configured to pivot relative to a vehicle body to allow access to a fuel fill pipe. Electric vehicles similarly include a recharge door that is pivotably attached to a vehicle body to allow access to a recharge port for recharging the vehicle.

In both gas powered and electric vehicles, additional elements, such as, e.g., lights, a heater, a lock, etc., may be included to work with, around, or on the fuel or recharge door. However, in conventional vehicle systems, each additional element, such as, e.g., a light, a heater, a motor, etc., is a separate component. That is, each of these elements must be separately sourced and individually installed into the system. Therefore, conventional refuel or recharge systems require a wire harness, i.e., a plurality of wires, extending from the refuel or recharge system to a vehicle controller. As a result, existing refuel and recharge systems are complex systems that require considerable amounts of coordination, time, and money. Therefore, a need exists for a simplified refuel/recharge system.

SUMMARY

In one embodiment a control system for a refuel or recharge door of a vehicle is disclosed. The vehicle has a vehicle controller, a housing having a port, a door removably attached to the housing, a system controller communicably connected to the vehicle controller, and at least one module connected to the system controller. The system controller is configured to control the at least one module.

In another embodiment, a control system for a refuel or recharge door of an automobile is disclosed. The automobile has a vehicle controller, a housing having a port, a door removably attached to the housing, the door being configured to cover the port in a closed position and unobstruct the port in an open position, a system controller being communicably connected to the vehicle controller, and at least one module connected to the system controller so that the system controller controls the at least one module. The at least one module includes at least one of a latching module, a motor module, a light module, and a heating module.

In another embodiment, a control system for a refuel or recharge door of an automobile is provided. The automobile has a vehicle controller, a housing having a port, a door removably attached to the housing, the door being configured to cover the port in a closed position and unobstruct the port in an open position, a system controller communicably connected to the vehicle controller, and a plurality of modules connected to and controlled by the system controller. The plurality of modules includes at least a latching module, a motor module, a light module, and a heating module. Each of the plurality of modules is connected to a printed circuit board of the system controller with a wired connection.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

Conventional gas vehicles, such as automobiles, typically include a refuel system that includes a fuel fill pipe that extends from an opening, i.e., a fuel port, in a vehicle body. A fuel door is positioned to cover the fuel fill pipe, the door being configured to pivot relative to the vehicle body to allow access to the fuel fill pipe. Similarly, electric vehicles include a recharge system including a recharge door that is pivotably attached to a vehicle body to allow access to a recharge port for recharging the vehicle. In both cases, additional elements, such as, e.g., lights, a heater, a lock, etc., may be included to work with, around, or in the fuel or recharge system. For example, some vehicles have lights that illuminate during a refueling or recharging process. Further, some vehicles include a motor for opening and/or closing a fuel door. However, in conventional vehicle systems, each additional element, such as, e.g., a light, a heater, a motor, etc., is a separate component. That is, each of these elements must be separately sourced and individually installed into the system. Therefore, conventional refuel or recharge systems require a wire harness, i.e., a plurality of wires, extending from the refuel or recharge system to a vehicle controller. As a result, existing refuel and recharge systems are complex systems that require considerable amounts of coordination, time, and money. Therefore, a need exists for a simplified refuel/recharge system.

The present disclosure may alleviate some or all of the above-referenced deficiencies of conventional systems. Generally, the present disclosure provides a refuel/recharge system that includes a central hub for controlling a plurality of functional modules, such as, e.g., lights, a heater, a motor, etc. Therefore, systems according to embodiments of the present disclosure may be sourced as a complete system comprising a controller that is configured to control a plurality of functional modules. This controller may be communicably connected to a vehicle controller. As a result, rather than sourcing separate functional modules for a refuel or recharge system, vehicle manufacturers need only install a system according to embodiments of the present disclosure. The controller may additionally be configured to accept and control OEM and/or aftermarket modules. Furthermore, systems disclosed herein may be customizable according to a vehicle manufacturer's preferences. That is, functional modules may be selected and configured to accommodate particular requirements, further simplifying the sourcing and coordination process for vehicle manufacturers.

Embodiments of the present disclosure are discussed herein in connection with gas and electric automobiles; however, embodiments of the present disclosure may be installed in a variety of appropriate applications. Further, it should be understood that embodiments discussed herein in connection with refuel systems, i.e., gas vehicles, may also be used with recharge systems, i.e., electric vehicles, and vice versa. That is, throughout descriptions of embodiments herein, the terms "refuel system" and "refuel door" for gas vehicle installations may be replaced with or interchangeable with "recharge system" and "recharge door," respectively, for electric vehicle installations. Similarly, the term "refuel port" may be interchangeable with "recharge port".

Figure 1:
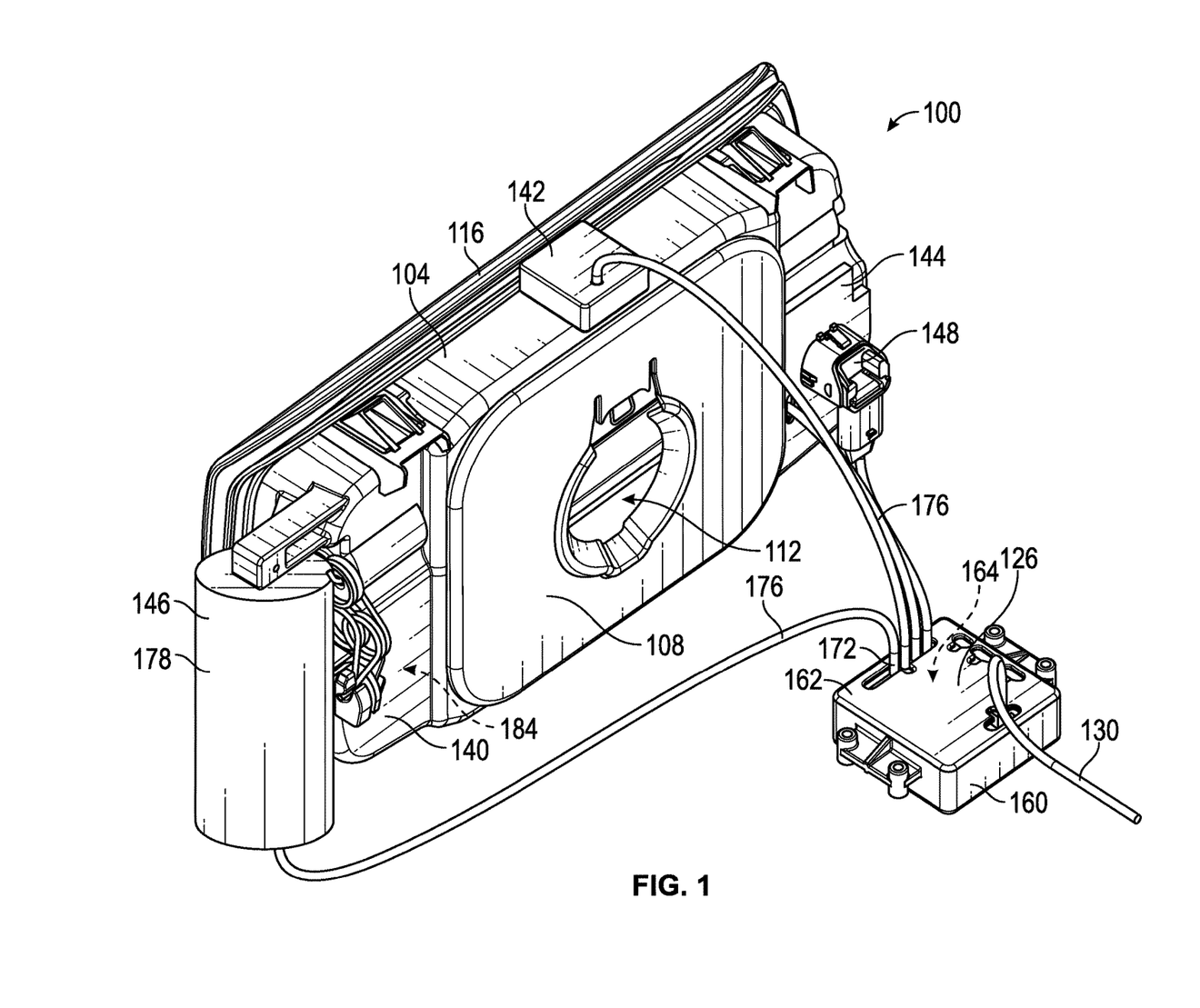
FIG. 1 is a rear, top, and right side isometric view of a control system for a refuel or recharge door, according to an embodiment of the disclosure.

FIG. 1 illustrates a control system 100 for use on a refuel or recharge door of a vehicle, such as an automobile, according to an embodiment of the present disclosure. The system 100 is configured to allow access to a fuel pipe (not shown). More specifically, the system 100, which may also be referred to as a refuel system or recharge system, may include a housing 104 having an internal wall 108 defining a fuel port 112. Generally, the fuel port 112 is configured to align with a fuel pipe that feeds into a fuel tank. Further, the system 100 includes a door 116 that is removably attached to the internal wall 108. The door 116 is configured to be outwardly disposed from the internal wall 108 when installed in the vehicle so that the door 116 substantially obstructs the fuel port 112 and the fuel pipe when the door 116 is in a closed position. Further, the door 116 is configured to be movable from the closed position to an open position in which the fuel port 112 is substantially unobstructed by the door 116. For example, turning to FIG. 2, in the illustrated embodiment, the door 116 is attached to the housing 104 with hinge 120 that is configured to pivot relative to the door 116 and the housing 104, thereby moving the door 116 away from the housing 104 and the fuel port 112. Although the illustrated embodiment illustrates the door 116 connected to the housing 104 with the pivotable hinge 120, embodiments of the present disclosure may include various configurations. Embodiments of the present disclosure, for example, may include one or more doors that are slidable, laterally or longitudinally translatable, or completely removable from the housing.

Figure 3:
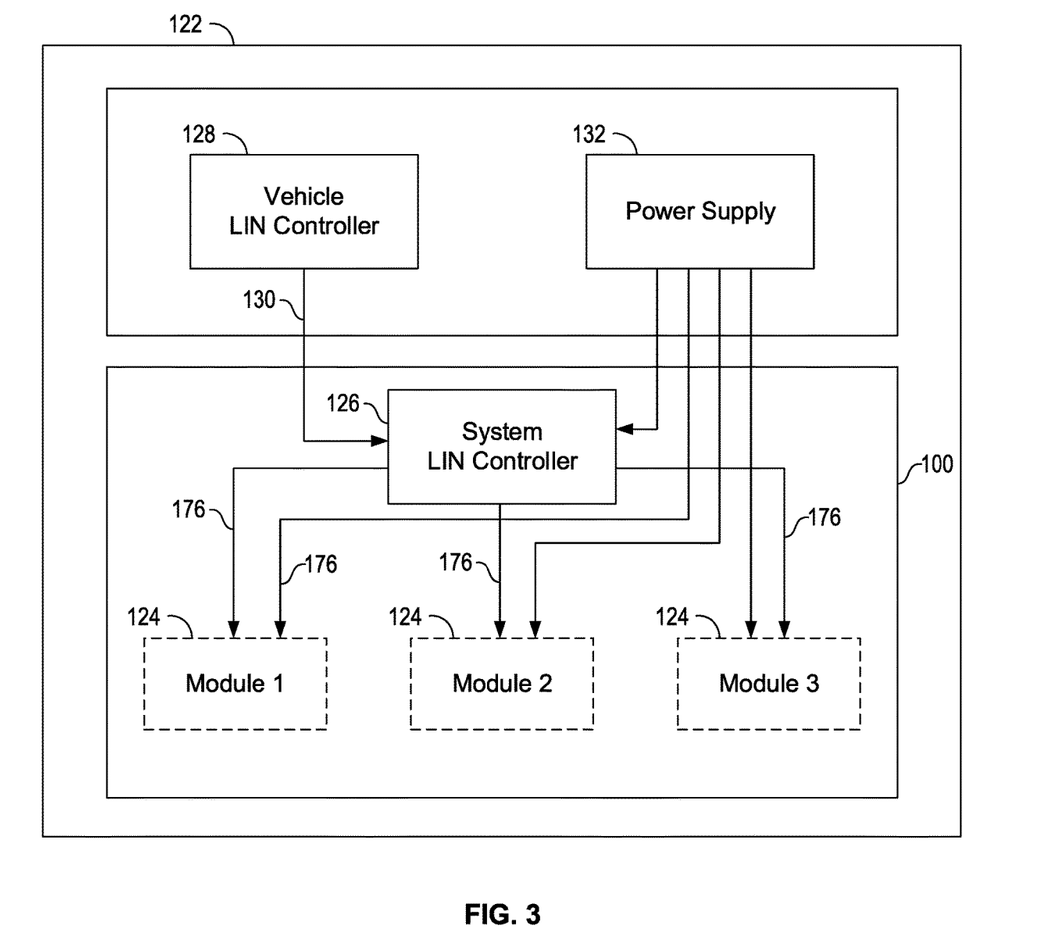
FIG. 3 is a schematic of a control system according to an embodiment of the disclosure.

As discussed above, embodiments of the present disclosure may provide a simplified fueling or recharge system. That is, systems disclosed herein may include a plurality of functional modules that may constitute a single system. Examples of functional modules include, but are not limited to, light modules, heating modules, latching modules, and motor modules. FIG. 3 provides an exemplary schematic of the control system 100, which may include a plurality of functional modules 124. The system 100 and its modules 124 may be installed in a vehicle 122. Contrary to conventional refuel and recharge systems, in which each of these modules are individually sourced and installed, the system 100 may be preassembled with these modules so that vehicle manufacturers receive it in a simplified, installation-friendly package. Although the schematic illustrates the system 100 having three modules 124, additional or fewer modules may be included. Further, it should be understood that systems according to embodiments of the disclosure may include a combination of different modules. For example, a system according to an embodiment may include at least one light module and/or at least one motor module. Moreover, a system may include only one module, such as, e.g., a heating module. An example of one particular combination of modules will be described below with respect to the system 100.

Still referring to FIG. 3, the system 100 includes a local interconnect network (LIN) controller 126 that is configured to communicate with and control the plurality of modules 124. The LIN controller 126, which may also be referred to as a system controller, may be connected to a vehicle LIN controller 128, for example, with wire 130, so that the LIN controller 126 may communicate with the vehicle 122. For example, the LIN controller 126 may be a slave LIN controller that is configured to communicate with a master LIN controller, i.e., the vehicle LIN controller 122, housed within the vehicle 122. Further, the LIN controller 126 and each of its modules 124 may be connected to and powered by a power supply 132.

Figure 4:
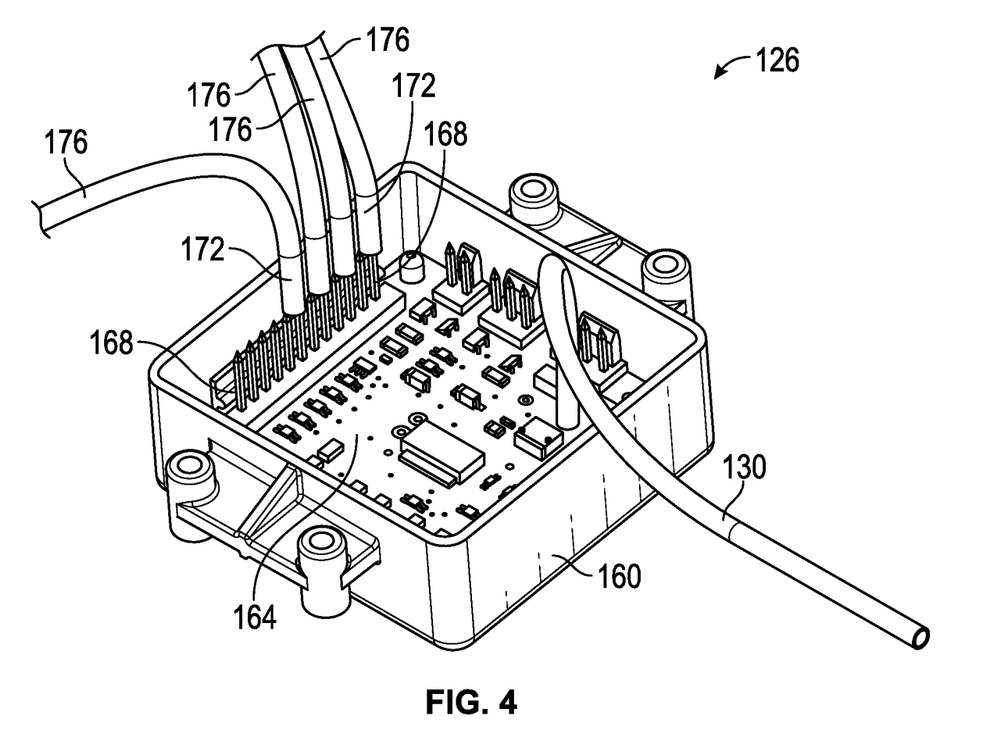
FIG. 4 is a rear, top, and right side isometric view of a system controller for use in the control system of FIG. 1 with a top removed from a housing.
Figure 7:
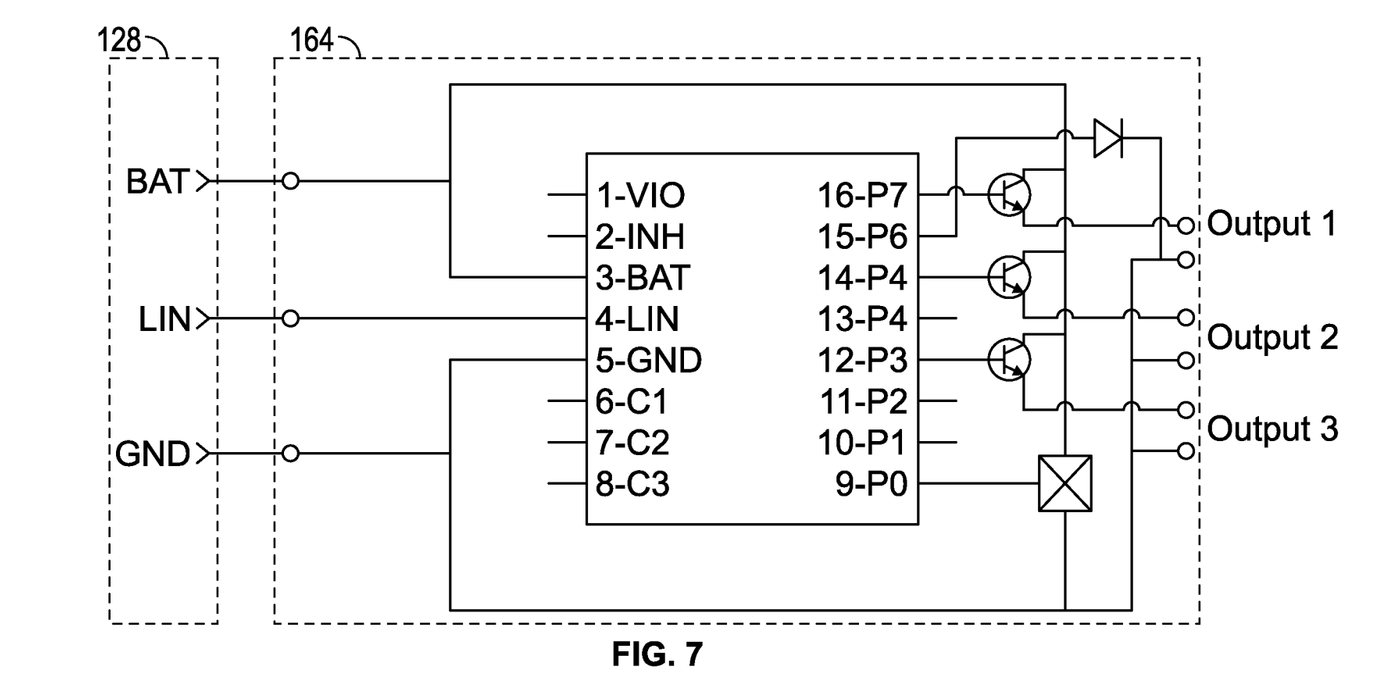
FIG. 7 is a schematic of a circuit board for use in the controller of FIG. 4.

Returning to FIG. 1, according to the present embodiment, the control system 100 includes a heating module 140, a first light module 142, a second light module 144, a motor module 146, and push-button module 148. The LIN controller 126 may comprise a controller housing 160 having a top 162 removably coupled thereto to enclose a printed circuit board (PCB) 164 that may be electrically integrated into a vehicle. That is, the PCB 164 may include internal processing capabilities for enabling it to share information with the vehicle. The PCB 164 may also be configured to control multiple functions, such as, e.g., locking, lighting, actuating, heating, etc., with a 3-wire connection to the vehicle, as shown by an exemplary PCB schematic in FIG. 7. As a result, the system 100 is flexible and simplified when compared with conventional refuel and recharge systems. Moreover, each of the modules discussed herein, i.e., the heating module 140, the light modules 142,144, the motor module 146, and the push-button module 148, may be modular. That is, as best seen in FIG. 4, each module may be connected to pins 168 on the PCB 164 with a wired connection using basic connectors, thereby providing enhanced customization and adjustment capabilities. In the illustrated embodiment, each of the heating module 140, the light modules 142,144, the motor module 146, and the push-button module 148 is connected to one of the pins 168 of the PCB 164 with a connector 172 at an end of a wire 176. However, some pins 168 may remain vacant to provide room for additional modules to be installed.

Figure 5:
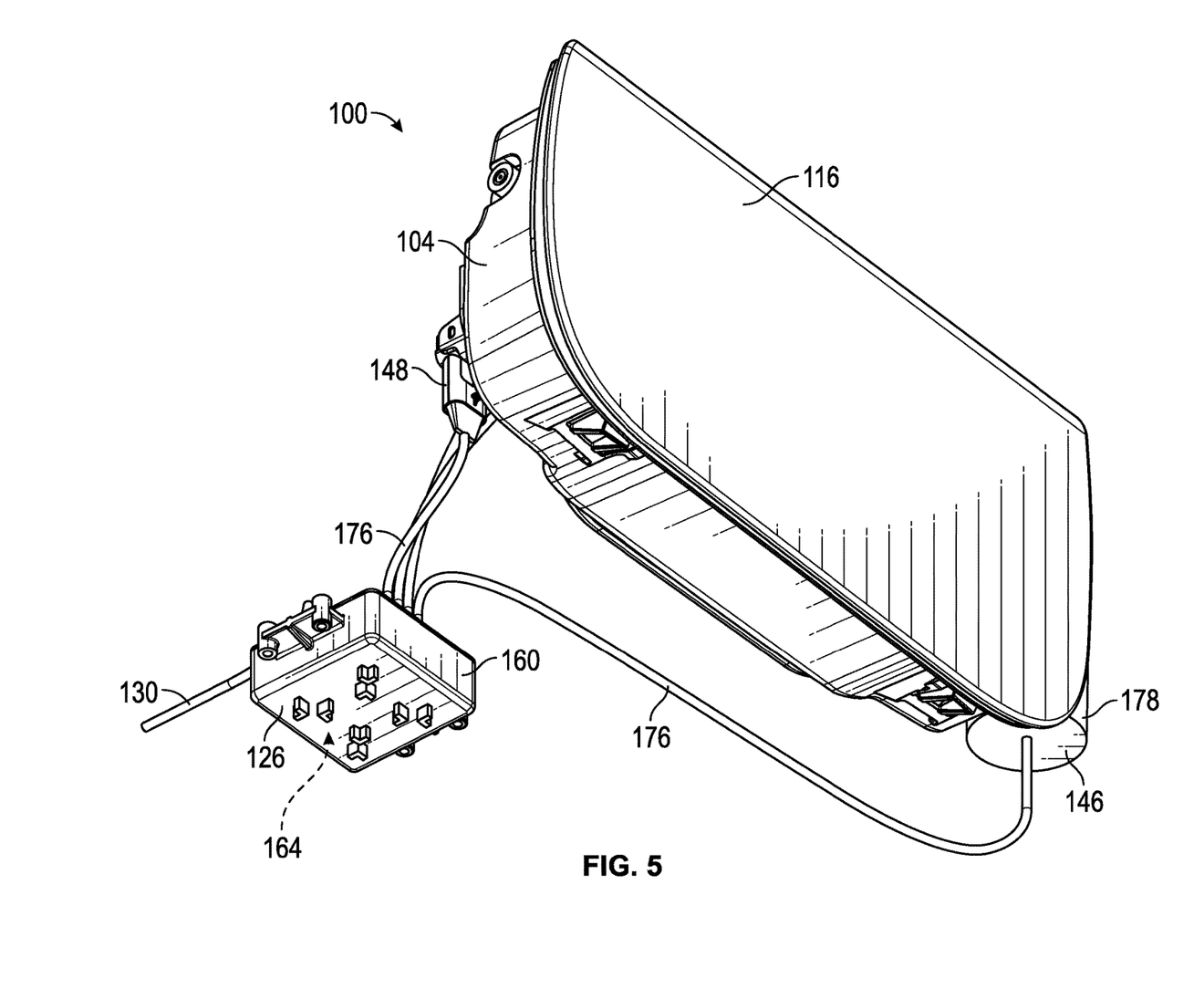
FIG. 5 is a front, bottom, and left side isometric view of the control system of FIG. 1 with the door in a closed position.
Figure 6:
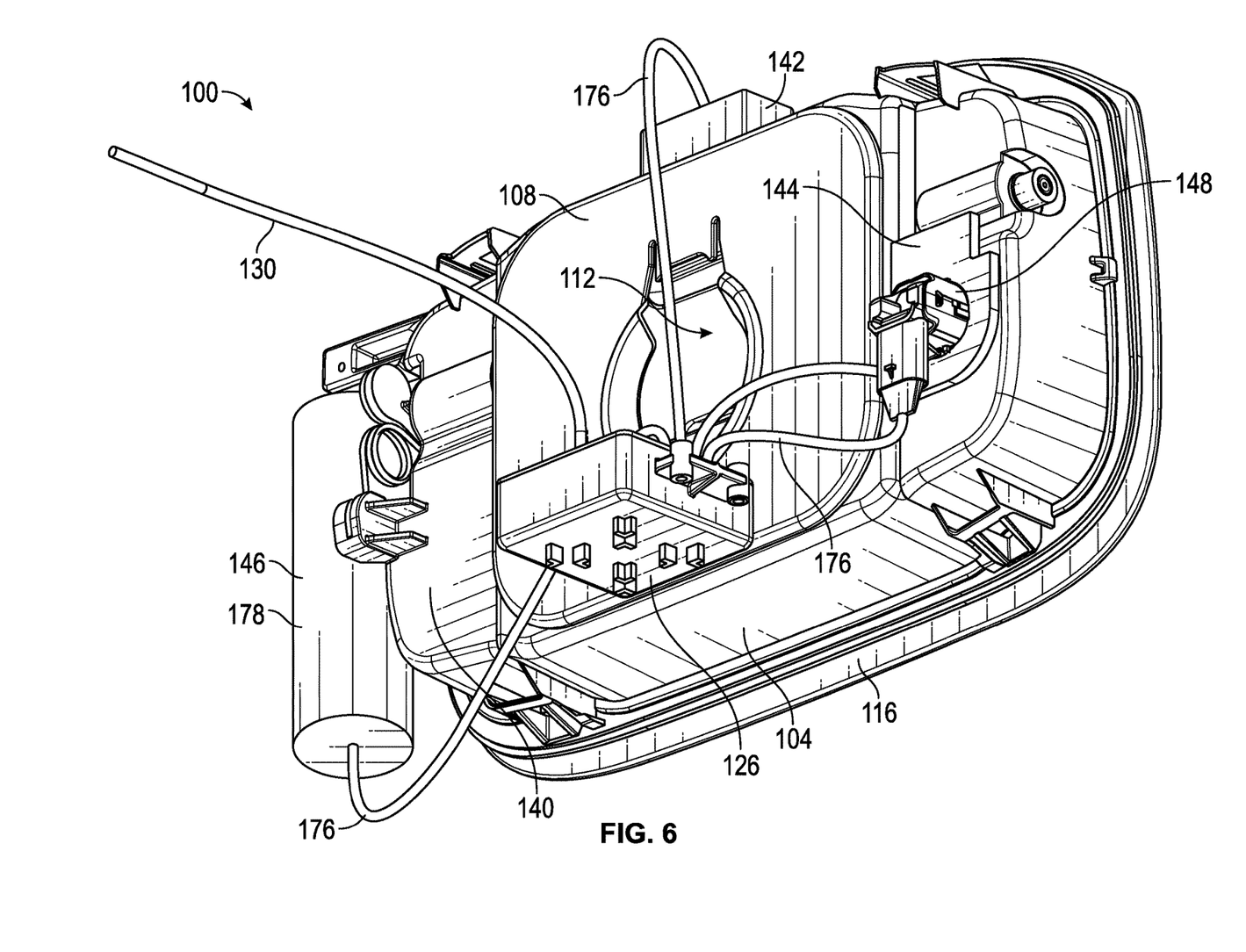
FIG. 6 is a rear, bottom, and left side isometric view of the control system of FIG. 1.

Returning to FIG. 1, the system 100 includes the motor module 146. The motor module 146 may be configured to move the door 116 from the open position to the closed position, and vice versa. More specifically, referring to FIGS. 2 and 5, the motor module 146 may be configured to move the door 116 between the open position, e.g., shown in FIG. 2, and the closed position, e.g., shown in FIG. 5. The motor module 146 is configured to automatically open and/or close the door 116 when instructed to do so by the LIN controller 126. In some installations, the LIN controller 126 may control the motor module 146 when a vehicle controller signals to do so. For example, a user may issue a command via a remote control or control on a dashboard of the vehicle, and that command may be sent to the LIN controller 126 to initiate the operation.

In some embodiments, the motor module 146 may comprise a motor and an actuator that may drive the door 116 open and/or closed automatically. Further, in some embodiments, e.g., a potentiometer may be used to control speed and degree of rotation of the motor. The potentiometer therefore controls voltage to the motor, thereby controlling the degree of rotation of the motor. Furthermore, in some embodiments, additional or alternative motor modules known in the art may be used for opening and/or closing a door. Additionally, in some embodiments the motor module may not be provided, i.e., the fuel door may be configured to be opened and/or closed manually.

In addition to opening and/or closing the door 116, the system 100 may include a latching module 178 for locking the door 116 in the closed position. In some embodiments, the latching module 178 may be an independent module that is connected to the PCB 164. Further, in some installations, the latching module 178 may be controlled by a vehicle controller. That is, the latching module 178 is not connected to or controlled by the system controller, such as the system LIN controller 126. In the illustrated embodiment, however, the latching module 178 is integrated into the motor module 146. The latching module 178 is generally configured to automatically lock and/or unlock the door 116. For example, in some embodiments, the latching module 178 may a use push-push mechanism for locking and unlocking the door. In this configuration, a motor module, such as the motor module 146 described above, may be configured to move the door from the closed position to an over-pressed position, thereby releasing the push-push mechanism. After releasing the push-push mechanism, the motor module may automatically move the door to the open position. To close the door, the motor module may move the door from the open position to the over-pressed position in order to reactivate the push-push mechanism, thereby reengaging the latching mechanism. Additionally or alternatively, a user may manually engage or release the push-push mechanism.

Furthermore, some embodiments may include a latching module 178 that uses an electronic lock that may, for example, comprise a solenoid. For example, a LIN controller, such as LIN controller 126, may signal the latching module 178 to automatically engage and/or disengage the electronic lock. The electronic lock may be used with a motor module, such as the motor module 146 described above, to provide an entirely autonomous door. In any motor module and latching module installation, one or more sensors, such as, e.g., sensor 180 shown in FIG. 2, may be used with the modules to monitor a position of the door. The sensor 180 may be a position sensor, such as, e.g., an optical sensor, an inductive sensor, or a hall effect sensor. This information may be used to determine when a latching module 178 should be activated. Further, this information may be shared with the vehicle so that a user can be notified of the state of the door.

Still referring to FIG. 1, in the illustrated embodiment, the system 100 includes the heating module 140. The heating module 140 may include a heater 184 that is configured to heat components of the system 100 during certain conditions. For example, the heater 184 may be an electric heater including a resistive wire that is configured to activate when cold ambient temperatures are detected. In some embodiments, therefore, one or more temperature sensors, such as thermocouples or thermistors, may be included in the system. That is, a temperature sensor, such as sensor 188 shown in FIG. 2, may be configured to communicate with the LIN controller 126 to indicate low temperature conditions. Accordingly, the LIN controller 126 may, in response, activate the heating module 140. The LIN controller 126, for example, may activate the heating module 140 when temperatures below freezing are detected. Additionally or alternatively, the LIN controller 126 may receive temperature conditions from the vehicle itself. That is, most conventional automobiles include temperature sensors, so the LIN controller 126, which may be communicably connected to the vehicle, may monitor temperature conditions using temperature data from the vehicle. Generally, heating modules, such as the heating module 140, may be used to mitigate or remedy ice and snow from impeding door operation in cold months.

With continued reference to FIG. 1, the system 100 includes the push-button module 148. The push-button module 148 may be particularly useful for installations in an electric vehicle. More specifically, turning to FIG. 2, the push-button module 148 may include a push-button switch 192 that is configured to unlock a charge cable from the vehicle after charging is complete. When charging has ceased, a user may manually press the push-button switch 192 to allow removal of the charge cable. Additionally or alternatively, when (or as) a vehicle is actively charging, a user may manually press the push-button switch 192 to release the charge cable, thereby terminating charging prematurely, i.e., before reaching a full charge status. Therefore, the push-button switch 192 may be communicably connected to the LIN controller 126, and the LIN controller 126 may be configured to engage and/or release a charge cable latch that is configured to lock a charge cable to a charge port.

Returning to FIG. 1, systems according to embodiments of the present disclosure may include one or more light modules. In the illustrated embodiment, the system 100 includes the first light module 142 and the second light module 144. The first light module 142 is included to illuminate during a recharge or refuel process, i.e., when the door 116 is in the open position. In some embodiments, one or more light modules may be configured to illuminate when the door is in the open position. In some embodiments, one or more light modules may be configured to illuminate when the vehicle is actively charging or refueling. Further, in some embodiments, one or more light modules may be configured to deactivate after charging or refueling has ceased. Additionally or alternatively, in some embodiments, one or more light modules may be configured to deactivate after a preset duration of time, such as, e.g., one, two, five, or ten minutes.

Figure 2:
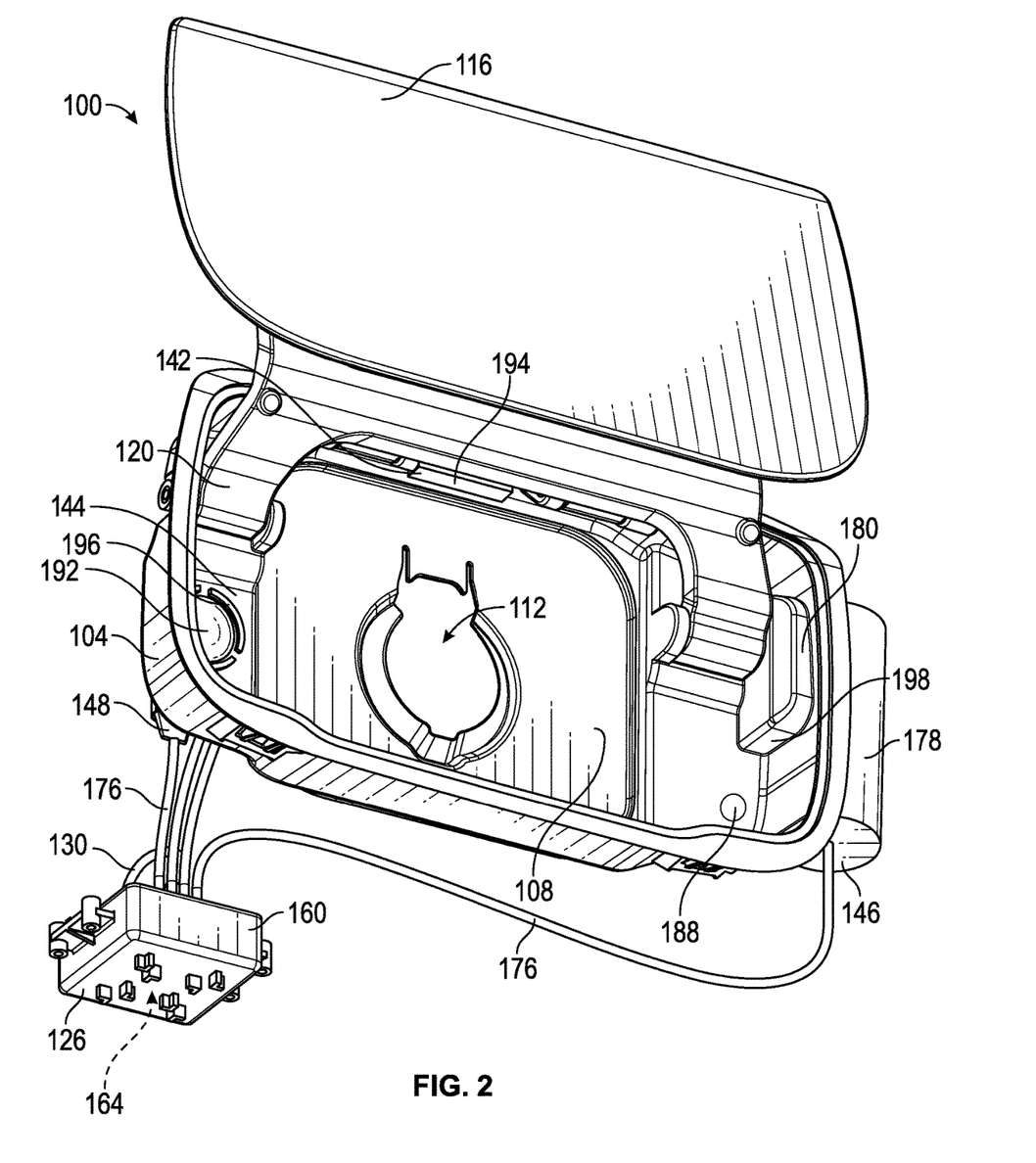
FIG. 2 is a front, bottom, and left side perspective view of the control system of FIG. 1 with the door in an open position.

In the illustrated embodiment, as best seen in FIG. 2, the first light module 142 includes an LED light 194 that is positioned to illuminate an area surrounding the refuel port 112 of the system 100. Therefore, in instances when a user is refueling in the dark, visibility may be enhanced. The second light module 144 may similarly include one or more LEDs 196, e.g., RGB LEDs, that are arranged around the push-button switch 192 discussed above. The second light module 144 may be configured to provide a refuel or recharge status. For example, in electric vehicle installations, the second light module may include multi-color capabilities for clearly communicating a charge status of the vehicle be varying color, flashing, pulsing, etc. In some embodiments, more or fewer light modules may be used. For example, some embodiments may include a light module that provides a light integrated into a latching module. The light may be arranged so that it projects from, i.e., pipes from, the latching module itself. Some embodiments may include light modules having one or more lights, such as, e.g., one or more LEDs, that are directed onto a remote location. Additionally or alternatively, embodiments may include light modules comprising one or more LEDs that encircle a charge port or refuel port, such as, e.g., the fuel port 112.

In any installation, light modules may be configured to activate when the door is open. Therefore, a LIN controller, such as the LIN controller 126, may activate the light modules when the controller detects the door is open via position sensors, such as the sensor 180. Alternatively, light modules may be configured to activate when the door is open during particular times-of-day. For example, the LIN controller may receive time-of-day information from the vehicle to determine when to activate one or more light modules. Additionally or alternatively, light modules may be configured to activate when ambient light is below a preset value. For example, optical sensors, such as, e.g., sensor 198, may monitor ambient light, and the LIN controller may be configured to activate and/or deactivate the light modules in response to parameters detected by the sensors. Some embodiments may include a plurality of light modules, each including one or more lights. However, some embodiments may be configured so that only select light modules and/or select lights within light modules activate in response to particular conditions. Furthermore, in any installation, light modules may be controlled directly by a vehicle controller. That is, the one or more light modules may not be connected to the PCB of the system controller, such as PCB 164 shown in FIG. 4.

Again, the present disclosure may provide a refuel/recharge system that includes a controller for controlling a plurality of functional modules, such as, e.g., lights, a heater, a motor, etc. Therefore, contrary to conventional refuel and recharge systems, vehicle manufacturers need only source a system according to embodiments of the present disclosure, which may include a plurality of functional modules. Further, additional or alternative modules may be used with systems disclosed herein, and the systems may be customized according to vehicle requirements. That is, functional modules may be selected and configured to accommodate particular requirements, further simplifying the sourcing and coordination process for vehicle manufacturers.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative embodiments of the present disclosure. The claims are to be construed to include alternative embodiments to the extent permitted by the prior art.

Various features of the disclosure are set forth in the following claims.

The invention claimed is:

1. A control system for a refuel or recharge door of a vehicle, the vehicle comprising a vehicle controller, the control system comprising:
    a housing having a port;
    a door removably attached to the housing;
    a system controller being communicably connected to the vehicle controller; and
    at least one module connected to the system controller, wherein the system controller is configured to control the at least one module,
    the at least one module including:
        a first light module connected to the system controller and arranged to illuminate an area adjacent to the port during a recharge or refuel process; and
        a second light module connected to the system controller and arranged to illuminate a switch and configured to provide a refuel or recharge status.

2. The control system of claim 1, wherein the at least one module comprises at least one of a latching module, a motor module, a light module, and a heating module.

3. The control system of claim 1, wherein the door is configured to cover the port of the housing in a closed position.

4. The control system of claim 3, where the door is configured to unobstruct the port of the housing in an open position.

5. The control system of claim 1, wherein the at least one light module is configured to vary a color, to flash, or to pulse to indicate the refuel or recharge status.

6. The control system of claim 1, wherein the at least one light module is configured to illuminate the area adjacent to the port when the door is in the open position.

7. The control system of claim 6, wherein the at least one module further comprises a sensor configured to detect a position of the door and communicate the position of the door to the system controller, and wherein the system controller is configured to control the light module according to the position of the door.

8. The control system of claim 7, wherein the sensor is at least one of an optical sensor, an inductive sensor, or a hall effect sensor.

9. The control system of claim 1, wherein the at least one light module is configured to illuminate the area adjacent to the port in response to a detected ambient light intensity.

10. The control system of claim 9, wherein the at least one module further comprises a sensor configured to detect the ambient light intensity and communicate the ambient light intensity to the system controller, and wherein the system controller is configured to control an intensity of the light module according to the ambient light intensity.

11. A control system for a refuel or recharge door of an automobile, the automobile comprising a vehicle controller, the control system comprising:
    a housing having a port;
    a door removably attached to the housing, the door being configured to cover the port in a closed position and unobstruct the port in an open position;
    a system controller being communicably connected to the vehicle controller; and
    at least one module connected to the system controller so that the system controller controls the at least one module, the at least one module comprising at least one of a latching module, a motor module, a light module, and a heating module, the at least one module including:

a first light module connected to the system controller and arranged to illuminate an area adjacent to the port during a recharge or refuel process; and a second light module connected to the system controller and arranged to illuminate a switch and configured to provide a refuel or recharge status, wherein the system controller controls the first light module and the second light module independently.

12. A control system for a refuel or recharge door of an automobile, the automobile comprising a vehicle controller, the control system comprising:

a housing having a port;

a door removably attached to the housing, the door being configured to cover the port in a closed position and unobstruct the port in an open position;

a system controller being communicably connected to the vehicle controller; and a plurality of modules connected to and controlled by the system controller, the plurality of modules comprising at least a latching module, a motor module, a light module, and a heating module, the at least one module including:

a first light module connected to the system controller and arranged to illuminate an area adjacent to the port during a recharge or refuel process; and a second light module connected to the system controller and arranged to illuminate a switch and configured to provide a refuel or recharge status, wherein the system controller controls the first light module and the second light module independently, wherein each of the plurality of modules is connected to a printed circuit board of the system controller with a wired connection.

* * * * *